United States Patent [19]

Tang

[11] Patent Number: 5,597,541
[45] Date of Patent: Jan. 28, 1997

[54] APPARATUS FOR CLEANING AND COOLING SYNTHESIZED GAS

[75] Inventor: John T. Tang, Robbinsville, N.J.

[73] Assignee: Foster Wheeler Energy Corporation, Perryville, N.J.

[21] Appl. No.: 512,256

[22] Filed: Aug. 7, 1995

Related U.S. Application Data

[63] Continuation-in-part of Ser. No. 198,752, Feb. 18, 1994, Pat. No. 5,464,597.

[51] Int. Cl.$^6$ .............. B01J 8/18; B01D 53/12; B01D 53/48
[52] U.S. Cl. .............. 423/244.01; 423/244.07; 422/144; 422/145; 422/173; 422/177; 422/190; 422/217; 422/219; 422/235; 422/224; 96/123; 96/150; 55/320; 55/327
[58] Field of Search ............... 422/144, 173, 422/145, 177, 190, 217, 219, 224, 235; 423/210, 242.1, 244.07, DIG. 16, 244.01; 96/123, 150; 55/320, 327

[56] References Cited

U.S. PATENT DOCUMENTS

| | | | |
|---|---|---|---|
| 3,981,355 | 9/1976 | Squires | 165/2 |
| 4,239,693 | 12/1980 | McCallister | 260/449.5 |
| 4,246,242 | 1/1981 | Butler et al. | 423/210 |
| 4,273,750 | 6/1981 | Hollett, Jr. et al. | 423/244 |
| 4,346,064 | 8/1982 | Leon | 423/244 |
| 4,351,650 | 9/1982 | Shinoda et al. | 55/181 |
| 4,409,196 | 10/1983 | Skinner et al. | 423/359 |
| 4,539,188 | 9/1985 | Hirsch et al. | 423/210 |
| 4,548,797 | 10/1985 | Sauer et al. | 423/240 |
| 4,613,344 | 9/1986 | Henrich et al. | 48/77 |
| 5,032,143 | 7/1991 | Ritakallio | 422/139 |
| 5,096,680 | 3/1992 | Lindbauer et al. | 423/239 |
| 5,140,950 | 8/1992 | Abdulally | 122/4 |
| 5,205,350 | 4/1993 | Hirsch et al. | 165/104.18 |
| 5,218,932 | 6/1993 | Abdulally | 165/104.18 |
| 5,226,475 | 7/1993 | Ruottu | 165/104.18 |
| 5,294,410 | 3/1994 | White | 422/171 |
| 5,363,812 | 11/1994 | Belin et al. | 122/4 |
| 5,393,315 | 2/1995 | Alliston et al. | 55/269 |
| 5,424,043 | 6/1995 | Martin et al. | 422/171 |
| 5,464,597 | 11/1995 | Tang | 423/210 |

*Primary Examiner*—Nina Bhat
*Attorney, Agent, or Firm*—Hayes and Boone, L.L.P.

[57] ABSTRACT

An apparatus for treating gas introduced into a vessel containing a particulate material at a temperature less than that of the gas in a manner so that said material reduces the temperature of the gas and the gas entrains at least a portion of the material. The entrained material is then separated from the gas and passed to a heat exchanger to cool the material while the separated gas is passed to a turbine to drive same. At least a portion of the exhaust gas from the turbine is passed to the heat exchanger in a manner to fluidize the material in the heat exchanger and the cooled separated material is returned back to the vessel.

32 Claims, 1 Drawing Sheet

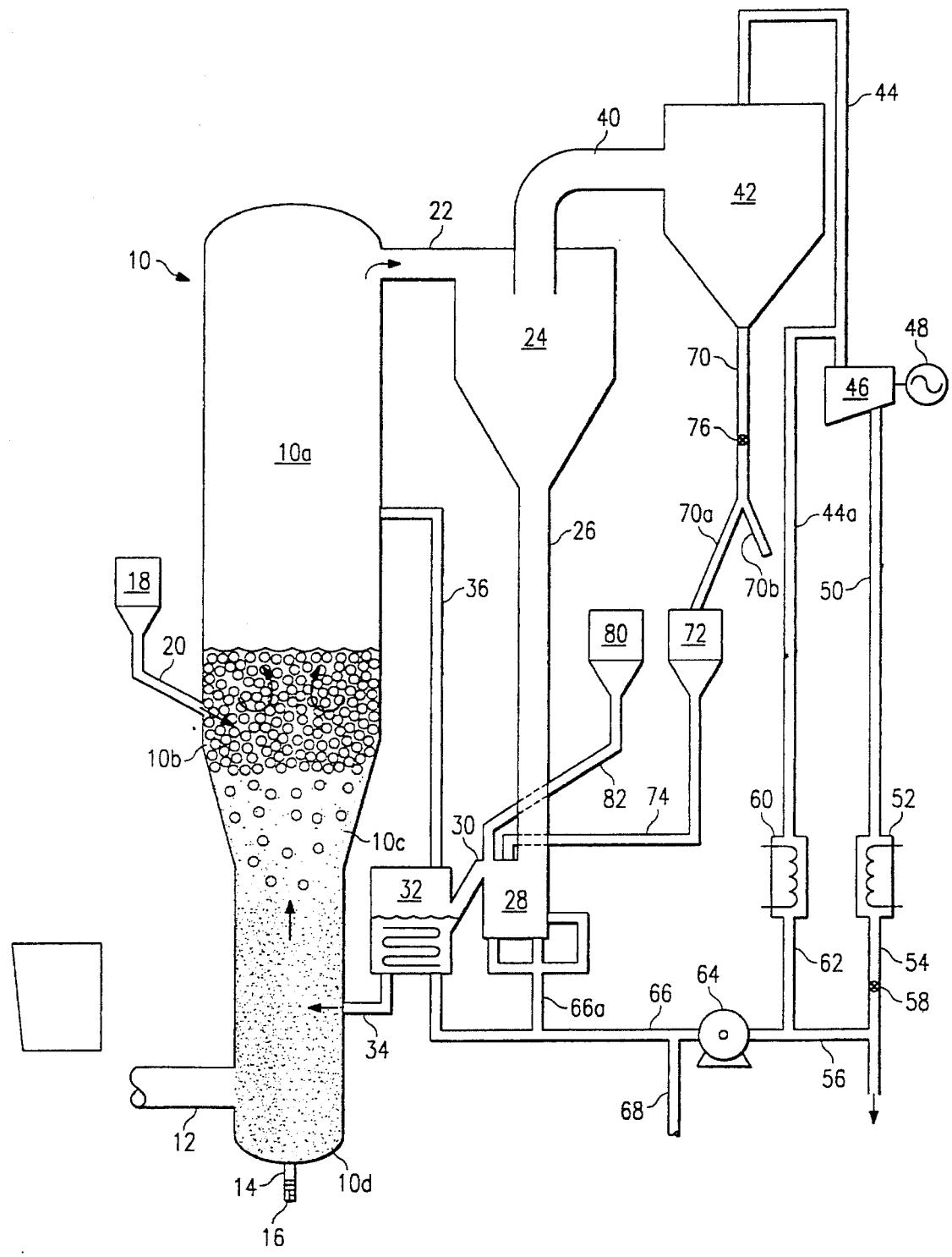

APPARATUS FOR CLEANING AND COOLING SYNTHESIZED GAS

CROSS-REFERENCE TO RELATED APPLICATION

This application is a continuation-in-part of application Ser. No. 08/198,752 filed Feb. 18, 1994, now U.S. Pat. No. 5,464,597.

BACKGROUND OF THE INVENTION

This invention relates to an apparatus for cleaning and cooling synthesized gas and, more particularly, to such an apparatus utilizing particulate material which is spouted in, and recirculated through, a vessel.

Several well-known techniques are available for producing synthesized gas (hereinafter referred to as "syngas") which is used for driving gas turbines, or the like. However, the syngas so produced often contains a relative high quantity of sulfur which must be removed to comply with federal and state emissions standards.

One of the most popular techniques for removing the sulfur constituents from the syngas is a wet scrubbing process which is relatively expensive. Another sulfur-removing process which is more cost-effective involves reacting a sorbent, such as limestone, with the syngas at a proper temperature so that the sorbent absorbs, or captures, the sulfur. However, syngas that is produced in accordance with conventional techniques is usually at a relatively high temperature (i.e., in excess of 2000° F.) which is above that necessary to achieve this type of absorption.

SUMMARY OF THE INVENTION

It is therefore an object of the present invention to provide an apparatus of the above type in which the temperature of the syngas is reduced to a level consistent with the absorption of the sulfur.

It is a further object of the present invention to provide an apparatus of the above type which includes a spouting bed of particulate material formed in a vessel into which the syngas is introduced.

It is a still further object of the present invention to provide an apparatus of the above type in which a separator is provided to separate the entrained particulate material from the syngas and return the particulate material to the vessel.

It is a still further object of the present invention to provide an apparatus of the above type in which a pressure seal is established between the vessel inlet and the separator outlet to prevent the backflow of the separated material from the latter inlet to the latter outlet.

It is a still further object of the present invention to provide an apparatus of the above type in which a heat exchanger is provided between the pressure seal outlet and the vessel inlet to receive the separated material from the pressure seal and cool same before the material is returned to the vessel.

It is a further object of the present invention to provide an apparatus of the above type in which the separated syngas is used to drive a turbine and the exhaust gases from the turbine are passed to the pressure seal and to the heat exchanger to fluidize and cool the material therein.

Towards the fulfillment of these and other objects, according to the present invention, syngas is introduced into a vessel containing a particulate material at a temperature less than that of the syngas in a manner so that said material reduces the temperature of the syngas and the syngas entrains at least a portion of the material. The entrained material is then separated from the syngas and passed to a pressure seal and to a heat exchanger to seal against any backflow from the vessel and cool the material, respectively. The separated syngas is passed to a turbine to drive same, and at least a portion of the exhaust gas from the turbine is passed to the pressure seal and the heat exchanger in a manner to fluidize the material therein to cool same before the cooled separated material is returned back to the vessel.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings which is a schematic representation of the apparatus of the present invention.

DESCRIPTION OF THE PREFERRED EMBODIMENT

Referring to the drawing, the reference numeral 10 refers, in general, to a vessel having an upper cylindrical section 10a, an intermediate conical section 10b, and a lower cylindrical section 10c, of a lesser diameter than the upper section 10a, which terminates in a conical section 10d. A horizontally-extending inlet duct 12 registers with a corresponding opening formed in the wall of the lower cylindrical section 10c for introducing syngas into the vessel 10, and a vertically-extending outlet duct 14 registers with the lower, open end of the conical section 10d for draining the vessel under the control of a valve 16 disposed in the latter duct.

A storage/transfer bin 18 is located adjacent the vessel 10 for storing and transferring a relatively coarse, inert material, such as coarse sand, to the vessel 10a, via a duct 20 connecting the outlet of the bin 18 to an inlet opening extending through the wall of the conical vessel section 10b. A duct 22 registers with an opening formed through the upper cylindrical vessel section 10a and connects the vessel 10 with a cyclone separator 24 disposed adjacent the vessel. A dipleg 26 connects the lower portion of the separator 24 to a pressure seal device, in the form of a J-valve 28, which, in turn, is connected, via a duct 30, to a heat exchanger 32. A duct 34 connects an outlet opening formed in the lower portion of the heat exchanger 32 to the vessel 10 via an opening formed in the wall of the lower vessel section 10c, and a duct 36 extends from an outlet opening formed in the upper portion of the heat exchanger 32 to an opening formed through the upper vessel section 10a.

A duct 40 extends from the interior of the separator 24 to a relatively fine-particle separating device 42, which has a gas outlet connected, by a duct 44, to the inlet of a gas turbine 46. The turbine 46 is connected to an electrical generator 48 to drive same, in a conventional manner. A duct 50 extends from the outlet of the turbine 46 to a heat exchanger 52 for receiving the exhaust gases from the turbine and cooling them in a manner to be described.

A duct 54 extends from the heat exchanger 52 to an exhaust stack (not shown) or the like, and a duct 56 registers with an opening in the duct 54 for receiving the exhaust gases from the latter duct. A valve 58 is disposed in the duct 54 for controlling the flow of the exhaust gases to the duct 56 and/or on through the duct 54 for exhaustion, in a conventional manner.

A duct 44a branches from the duct 44 upstream of the turbine 46 and extends to a heat exchanger 60 for routing the clean gases from the separating device 42 to the heat exchanger for cooling the gases. The outlet of the heat exchanger 60 is connected, via a duct 62, to the duct 56. Thus, the clean gases from the separating device 42 passing through the duct 44a bypass the turbine 46. It is understood that the aforementioned gases are respectively cooled in the heat exchangers 52 and 60 by passing a cooling fluid through a plurality of water tubes in the heat exchangers and in a heat exchange relation with the gases. Since this is a convention technique, it will not be described in any further detail.

The duct 56 extends to the inlet of a compressor 64, which thus receives both the clean gases from the duct 44a and the exhaust gases from the turbine 46 and compresses them, in a conventional manner. A duct 66 extends from the outlet of the compressor 64 to the inlet of the heat exchanger 32 and a duct 66a branches from the duct 66 and extends to the inlet of the J-valve 28. Thus the compressed gases are passed from the compressor 64 to the heat exchanger 32 and the J-valve 28. A duct 68 extends from an external source (not shown) of nitrogen gas or steam, and is connected to the duct 66 between the compressor 64 and the duct 66a to selectively add the nitrogen or steam to the gases in the duct 66.

A duct 70 extends from a solids outlet at the lower portion of the separating device 42 and branches into two branch ducts 70a and 70b, respectively. The branch duct 70a extends to a storage/transfer bin 72 having an outlet connected, via a duct 74, to an inlet formed in the J-valve 28. The branch duct 70b extends to an storage area (not shown) located externally of the device 42 and a valve 76 is provided in the duct 70 to control the flow of the fine solids from the separating device between the ducts 70a and 70b.

A storage/transfer bin 80 for a sulfur absorbing material, such as limestone, is provided adjacent the separator and has an outlet connected, via a duct 82, to the J-valve 28.

In operation, sand, or another relatively coarse, inert material, at ambient temperature passes from the bin 18 and into the vessel 10 where it accumulates in the lower vessel section 10c and the intermediate vessel section 10b. Syngas, from an upstream production facility, at an elevated temperature (usually in excess of 2000° F.) and containing sulfur and corrosive gaseous species and alkali particles, is also introduced into the vessel 10 through the inlet duct 12. Additional, relatively fine, sorbent material, such as limestone, also passes from the bin 80 into the vessel 10, via the J-valve 28 and the heat exchanger 32.

The velocity of the syngas introduced into the vessel 10 is controlled so that the bed material, including the inert and sorbent material, behaves as a "spouting" bed, i.e., the syngas mixes with and entrains the relatively fine material which is largely sorbent, while the relatively coarse inert material spouts and thus moves sufficiently in the vessel to promote the latter mixing. As a result, the syngas entrains a portion of the relatively fine, sorbent material, passes upwardly through the vessel 10 and exits through the opening in the upper vessel section and into the duct 22.

The separator 24 receives the syngas, with the entrained sorbent particles, from the duct 22 and operates to separate the former from the latter by cyclone separation in a conventional manner. The separated sorbent particles from the separator pass, via the dipleg 26, to the J-valve 28 which operates in a conventional manner to establish a pressure seal between the vessel 10 and the separator 24 to prevent backflow of the material contained in the vessel to the separator.

A fresh supply of sorbent particles from the bin 80 passes into the outlet section of the J-valve 28 and thus combines with the separated sorbent particles in the J-valve before the mixture passes into the heat exchanger 32. The heat exchanger 32 is of a conventional design and, as such, includes heat exchange tubes through which a cooling fluid is passed to remove heat from the mixture of particles before the latter pass into the vessel 10.

The separated gases from the separator 24 pass into the separating device 42 which operates in a conventional manner to remove additional, very fine, sorbent particles from the gases. A portion of the latter gases is passed to the turbine 46 to drive same and therefore the generator 48. The expanded exhaust gases from the turbine 46 pass through the heat exchanger 52 where they are cooled before they are exhausted through the duct 54 and/or passed to the duct 56. A portion of the clean gases from the separating device 42 are cooled in the heat exchanger 60 and passed directly to the duct 56, thus bypassing the turbine 46. The gasses in the duct 56 are passed to the compressor 64 where they are compressed before passing into the duct 66 and its branch duct 66a and into the heat exchanger 32 and the J-valve 28, respectively. These gases cool and fluidize the solid particles in the J-valve 28 and the heat exchanger 32 to promote the heat exchange process and promote the flow of the particles from the J-valve to the heat exchanger, and from the heat exchanger back to the vessel 10. Nitrogen gas or steam from the duct 68 can be introduced as needed into the duct 66 to reduce the oxygen content of the gas introduced to the heat exchanger 32 and the J-valve 28. The heat exchanger 32 is vented by the duct 36 which thus transfers excess gas therein to the vessel 10.

As a result of the foregoing, the syngas is cooled in the vessel 10 by the cooled sorbent materials from the heat exchanger 32 to a temperature required for reaction of the sorbent with the sulfur in the syngas which, in the case of limestone, is approximately 1600° F. Also, the recycled sorbent passes to the J-valve 28 where it is fluidized by the mixture of clean gases from the separating device 42 and exhaust gases from the turbine 46. The latter mixture also promotes the flow of the sorbent to the heat exchanger 32 and further cools the sorbent in the heat exchanger before it is introduced into the vessel 10 to promote the absorption of corrosive gaseous species and pollutants. Further, the advantages of both a spouting bed and a recirculation bed material are realized to improve mixing, temperature reduction and absorption.

It is understood that variations may be made in the foregoing without departing from the scope of the present invention. For example, a valve could be provided in the duct 44 upstream of the duct 44a to selectively control the flow of the gasses in these ducts.

Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. An apparatus for cooling and removing sulfur from gases, the apparatus comprising a vessel; means for introducing the gases into the vessel; the vessel containing a particulate material, including sorbent for the sulfur, at a temperature less than the gases so that the material cools the gases, removes the sulfur from the gases and is entrained by the gases; a separator for separating the entrained material from the gases; a pressure seal device connected between the separator and the vessel for permitting the material to flow from the separator to the vessel and for establishing a pressure seal between the vessel and the separator to prevent backflow from the vessel to the separator; and means for passing at least a portion of the gases from the separator to the pressure seal device to promote the flow of the material from the pressure seal device back to the vessel.

2. The apparatus of claim 1 wherein said means for passing at least a portion of the gases from the separator to the pressure seal device comprises a turbine for receiving at least a portion of the gases from the separator, and a conduit for connecting the turbine to the pressure seal device for passing the gases from the turbine to the pressure seal device.

3. The apparatus of claim 2 wherein a portion of the gases pass from the separator, through the turbine, and to the pressure seal device; and another portion of the gases pass from the separator directly to the pressure seal device.

4. The apparatus of claim 1 further comprising means for cooling the gases before they are passed to the pressure seal device.

5. The apparatus of claim 1 wherein said means for passing at least a portion of the gases from the separator to the pressure seal device comprises a compressor for receiving the gases from the separator and compressing the gases, and a conduit for connecting the compressor to the pressure seal device for passing the compressed gases from the compressor to the pressure seal device.

6. The apparatus of claim 1 further comprising a heat exchanger connected between the pressure seal device and the vessel for cooling the material passing from the pressure seal device to the vessel.

7. The apparatus of claim 6 further comprising means for passing a portion of the gases from the separator to the heat exchanger to further cool the material and to promote the flow of the material from the heat exchanger to the vessel.

8. The apparatus of claim 7 further comprising means for cooling the gases from the separator before they are passed to the heat exchanger.

9. The apparatus of claim 6 further comprising a compressor for receiving the gases from the separator and for compressing the gases, and means for passing the compressed gases from the compressor to the heat exchanger.

10. The apparatus of claim 6 wherein a portion of the gases pass from the separator, through the turbine, and to heat exchanger; and another portion of the gases pass from the separator directly to the heat exchanger.

11. The apparatus of claim 6 further comprising means for passing the sorbent from an external source to the heat exchanger for passage into the vessel.

12. An apparatus for cooling and removing sulfur from gases, the apparatus comprising a vessel; means for introducing the gases into the vessel; the vessel containing a particulate material, including sorbent for the sulfur, at a temperature less than the gases so that the material cools the gases, removes the sulfur from the gases and is entrained by the gases; a separator for separating the entrained material from the gases; a heat exchanger connected between the separator and the vessel for receiving the material from the separator, cooling the material and passing the material back to the vessel; and means for passing at least a portion of the gases from the separator to the heat exchanger to promote the flow of the material from the heat exchanger back to the vessel.

13. The apparatus of claim 12 wherein said means for passing at least a portion of the gases from the separator to the heat exchanger comprises a turbine, a conduit for connecting the separator to the turbine, and a conduit for connecting the turbine to the heat exchanger for passing the gases from the turbine to the heat exchanger.

14. The apparatus of claim 13 wherein a portion of the gases pass from the separator, through the turbine, and to the heat exchanger; and another portion of the gases pass from the separator directly to the heat exchanger.

15. The apparatus of claim 12 further comprising means for cooling the gases before they are passed to the heat exchanger.

16. The apparatus of claim 12 wherein said means for passing at least a portion of the gases from the separator to the heat exchanger comprises a compressor for receiving the gases from the separator and for compressing the gases, and a conduit for connecting the compressor to the heat exchanger for passing the compressed gases from the compressor to the heat exchanger.

17. A method for cooling and removing sulfur from gases, comprising the steps of introducing the gases into a vessel containing a particulate material, including sorbent for the sulfur, at a temperature less than the gases so that the material cools the gases, removes the sulfur from the gases and is entrained by the gases; separating the entrained material from the gases; establishing a pressure seal between the vessel and the separator to prevent backflow from the vessel to the separator; and passing at least a portion of the gases from the separator to the pressure seal to promote the flow of the material from the pressure seal back to the vessel.

18. The method of claim 17 wherein the step of passing comprises the steps of passing at least a portion of the separated gases to a turbine, and passing the separated gases from the turbine to the pressure seal.

19. The method of claim 18 wherein a portion of the separated gases pass through the turbine and to the pressure seal; and another portion of the separated gases pass directly to the pressure seal.

20. The method of claim 17 further comprising the step of cooling the separated gases before they are passed to the pressure seal.

21. The method of claim 17 further comprising the step of compressing at least a portion of the separated gases before they are passed to the pressure seal.

22. The method of claim 17 further comprising the step of cooling the separated material before it is passed back to the vessel.

23. The method of claim 22 wherein the material is cooled in a heat exchanger connected between the separator and the vessel and further comprising the step of passing a portion of the separated gases to the heat exchanger to further cool the material and to promote the flow of the material from the heat exchanger back to the vessel.

24. The method of claim 23 further comprising the step of cooling the separated gases before they are passed to the heat exchanger.

25. The method of claim 23 further comprising the step of compressing the separated gases before they are passed back to the heat exchanger.

26. The method of claim 23 wherein a portion of the separated gases pass through the turbine and to the heat exchanger, and another portion of the separated gases pass directly to the heat exchanger.

27. The method of claim 23 further comprising the step of passing the sorbent from an external source to the heat exchanger for passage into the vessel.

28. A method for cooling and removing sulfur from gases, comprising the steps of introducing the gases into a vessel containing a particulate material, including sorbent for the sulfur, at a temperature less than the gases so that the material cools the gases, removes the sulfur from the gases and is entrained by the gases; separating the entrained material from the gases; providing a heat exchanger between the vessel for cooling the separated material before it is passed back to the vessel; and passing at least a portion of the gases from the separator to the heat exchanger to further cool the material and to promote the flow of the material from the heat exchanger back to the vessel.

29. The method of claim 28 wherein the step of passing comprises the steps of passing the separated gases to a turbine, and passing the separated gases from the turbine to the heat exchanger.

30. The method of claim 29 wherein a portion of the separated gases pass through the turbine and to the heat exchanger; and another portion of the separated gases pass directly to the heat exchanger.

31. The method of claim 28 further comprising the step of cooling the separated gases before they are passed from the separator to the heat exchanger.

32. The method of claim 28 further comprising the step of compressing at least a portion of the separated gases before they are passed to the heat exchanger.

* * * * *